United States Patent [19]

Thompson

[11] 4,102,029

[45] Jul. 25, 1978

[54] METHOD FOR LOADING FILM TRANSPARENCIES INTO SLIDE MOUNTS

[75] Inventor: Edwin R. Thompson, Stamford, Conn.

[73] Assignee: Forox Corporation, Stamford, Conn.

[21] Appl. No.: 737,201

[22] Filed: Nov. 1, 1976

[51] Int. Cl.[2] .............................................. B23P 17/00

[52] U.S. Cl. .................................... 29/417; 29/33 K; 53/23; 53/123

[58] Field of Search ............... 29/417, 33 K, 806, 809; 53/23, 123

[56] References Cited

U.S. PATENT DOCUMENTS

| | | | |
|---|---|---|---|
| 3,019,579 | 2/1962 | Heckman | 53/123 |
| 3,141,275 | 7/1964 | Anderson et al. | 53/123 |
| 3,429,101 | 2/1969 | Anderson et al. | 53/123 X |
| 3,807,121 | 4/1974 | Mundt et al. | 53/123 X |
| 3,896,603 | 7/1975 | Tout | 53/123 |
| 4,003,187 | 1/1977 | Kiejzik | 53/123 |

*Primary Examiner*—Victor A. DiPalma
*Attorney, Agent, or Firm*—Parmelee, Johnson, Bollinger & Bramblett

[57] ABSTRACT

Method and apparatus are described for automatically loading film transparencies into pre-closed slide mounts either of plastic or of cardboard material and having an internal pocket for receiving the film transparency which is inserted through an openable region near one edge of the mount. In loading operation, wedge means temporarily spread the openable portion of the slide mount, defining a passageway for the film transparency to pass through into the mount, and then the two sides of the mount are allowed to spring back to their closed position after loading. Advantageously, the film transparency is cut off from the filmstrip before loading, with the freshly cut end of the strip serving as pushing means for pushing the film transparency into its mount, and thus low inertial forces are involved, because the individual cut transparency has only a small mass to be accelerated and moved. The film strip is bowed into a longitudinally extending arch for providing longitudinal stiffness for pushing the transparency. A common drive assembly performs the multiple functions of advancing the preclosed slide mounts from the stack station, through loading and printing stations and into the outlet, while also transporting the filmstrip to push the cut film transparency into the internal pocket in the slide mount, and thus a compact machine of relatively low power consumption can be constructed to embody this invention. In this embodiment, the edgewise movement of the pre-closed slide mount into the loading station achieves the slot spread wedging action, while the apparatus provides a convenient view of the advancing film strip and of the cut transparency during actual loading into the slide mount. An improved pre-closed slide mount is described.

18 Claims, 17 Drawing Figures

TRANSPARENT COVER
LIGHT SOURCE
TRANSLUCENT PANEL 65
67
166
16
20
66
176
164
140
158
42
43
44
50
163
54
40
41
174
11
STATIONARY BLADE

Fig. 7.
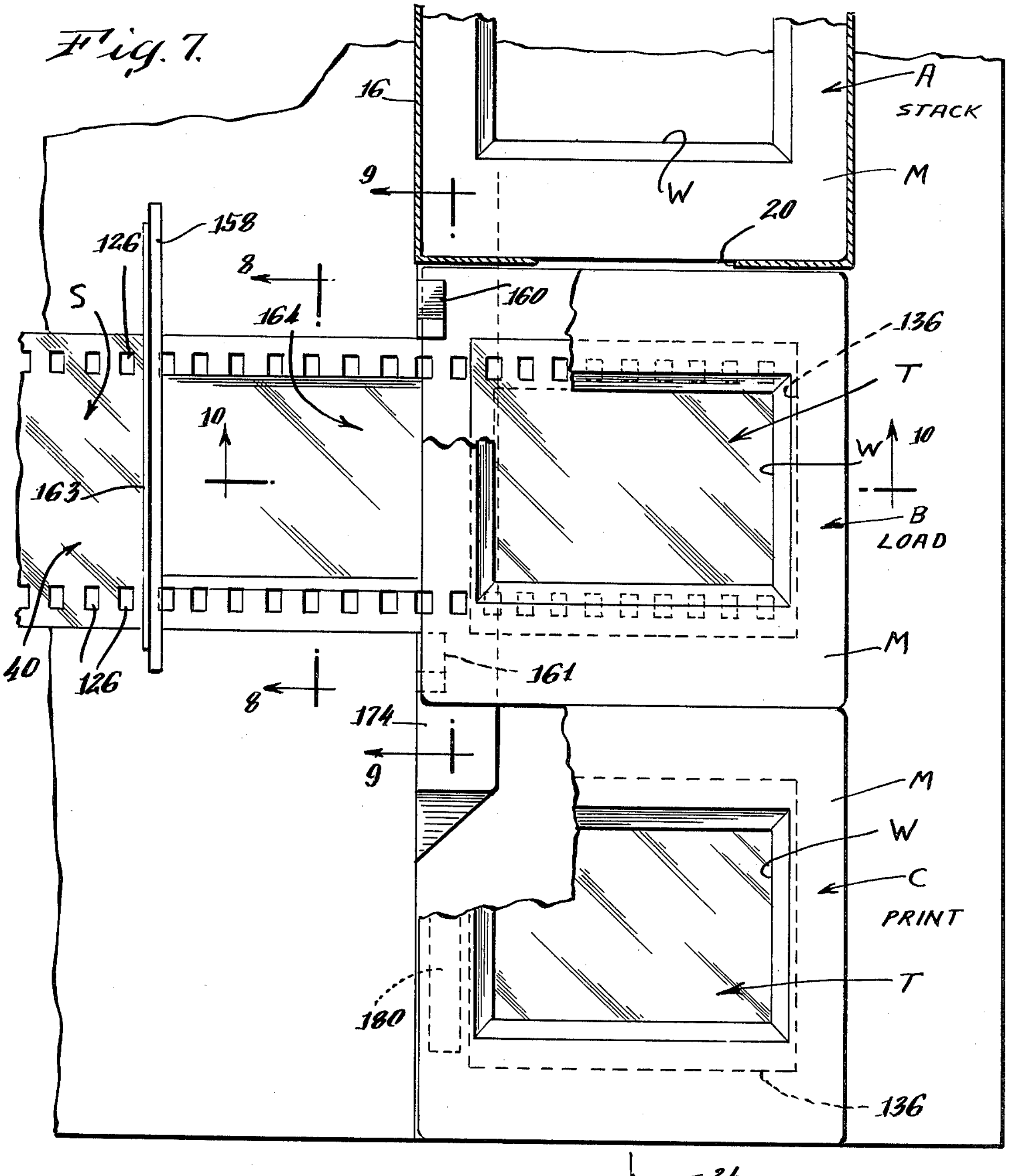
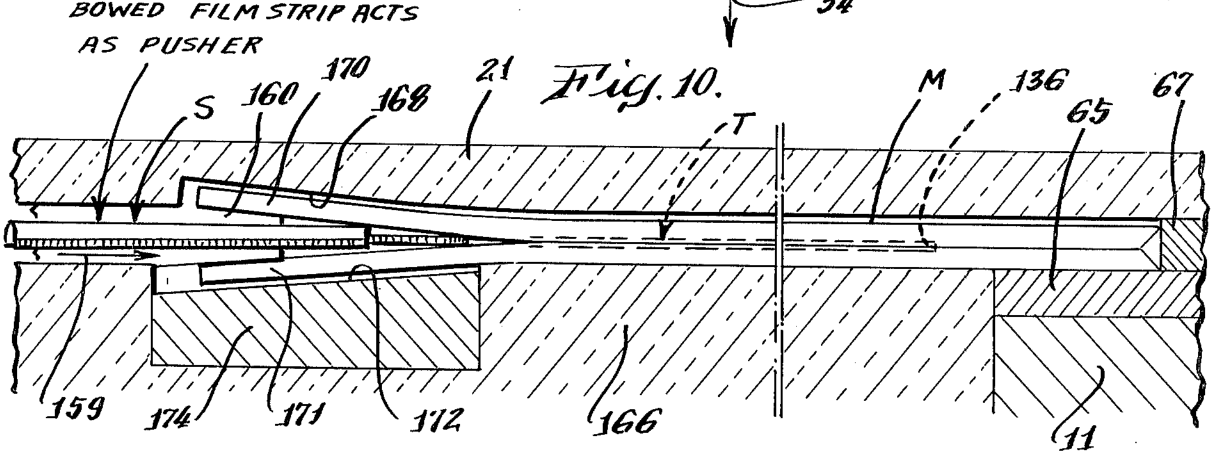
Fig. 10.

Fig. 8.
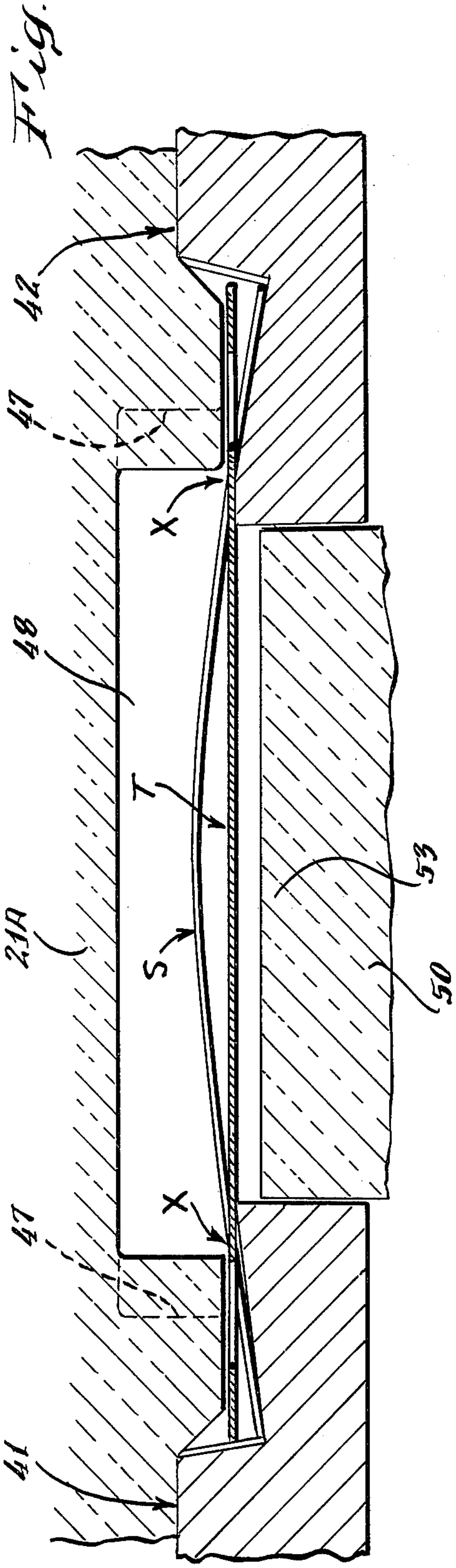
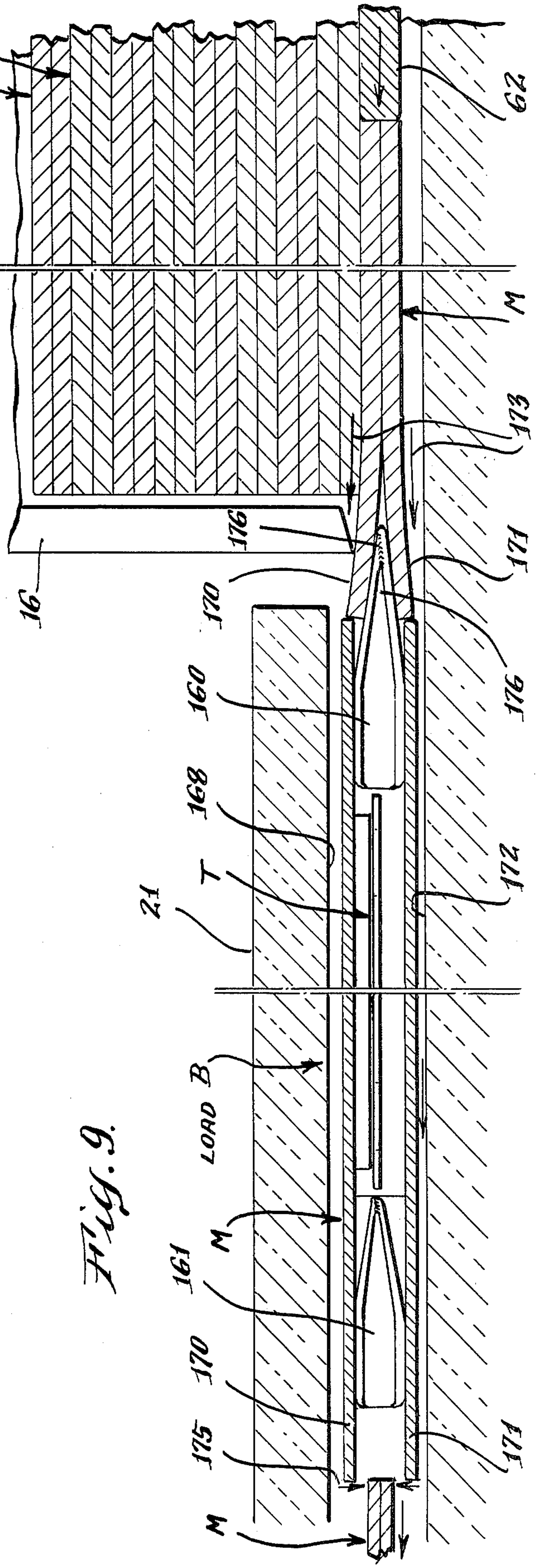
Fig. 9.

METHOD FOR LOADING FILM TRANSPARENCIES INTO SLIDE MOUNTS

FIELD OF THE INVENTION

The present invention is in the field of method and apparatus for automatically loading, i.e. inserting, film transparencies into slide mounts which have at least one window for viewing or projection of the transparency by transmitting light through the window and also relates to an improved pre-closed slide mount.

BACKGROUND OF THE INVENTION

There are slide mounting machines commercially available today, but these prior art machines are complex in construction and are larger and heavier than the apparatus described herein. These prior slide mounting machines are very expensive for a user to purchase because of the complex or elaborate mechanisms involved and are relatively slower in their output of loaded slide mounts per minute than the present apparatus. In most instances in these prior art slide amount machines, it is difficult or impossible for the operator to observe the film transparency as it is actually being loaded into the slide mount.

SUMMARY OF THE INVENTION

In accordance with the present invention, in one of its aspects, there is provided method and apparatus for automatically inserting film transparencies into pre-closed slide mounts at a relatively high rate of speed while avoiding the complexities of the prior art machines and while also providing a smaller and lighter weight machine which is more convenient to use. The pre-closed, or pre-sealed, slide mounts into which the transparencies are to be inserted may be made either of plastic or of cardboard material, depending upon the ultimate customer's wishes. The ability of the present film loading method and apparatus to handle slide mounts made from either material provides economically important flexibility in operation for the commercial establishment performing slide mount loading as a service for various customers.

The term "pre-sealed" or "pre-closed," as used herein, means that each slide has two sides or layers which are permanently fastened together in closed position by the slide manufacturer defining a receiving pocket between them. This fastening can be achieved by adhesive bonding, thermal bonding, ultrasonic bonding or any other suitable technique for securing multiple plies or layers of cardboard or of plastic together.

The slide mount is effectively pre-closed along three margins, to define the internal pocket into which the film transparency can later be inserted, and in which the transparency is snuggly held in position. The fourth margin is unsealed and defines an openable region near one end of the slide mount at the edge thereof. This loading slot can be temporarily sprung open by a slight amount by a wedging action for allowing a film transparency to be inserted by sliding movement into the internal pocket.

In accordance with the present invention in another of its aspects, there is the quick and easy method of loading a film transparency into a slide mount by providing a pre-closed slide mount having two sides defining a receiving pocket between them for receiving a film transparency into the pocket and defining an openable region near one end of the mount through which a film transparency can be slid into the pocket. A wedge member is moved relatively toward an edge of the mount near the openable region for engaging the wedge member between the two sides for temporarily resiliently spreading them apart in the vicinity of said slot. A strip of film transparencies is moved toward the wedge-spread region for sliding a leading transparency through the slot and into the pocket. Then the wedge member is moved relatively away from the mount for allowing the two sides to spring back into their original configuration for closing the slot. If desired, the openable region can be sealed for permanently retaining the transparency in the slide mount.

A presently preferred construction in order to enable the slide mount to be temporarily sprung open along its slot edge, the mount is provided with a small neat recess or clearance space which serves as an entry or "lead" near the slot edge. A pair of spaced wedge members are driven in sequence into this entry space, and they temporarily spread open the slot far enough for a film transparency to be pushed along a path between the wedge members and into the internal pocket in the slide mount. The manner in which these wedge members are driven into the slide mount for opening the loading slot is to provide stationary wedge means and to drive the slide mount edgewise into engagement with the wedge means.

It is the relative motion between slide mount and the pair of wedge members which causes them to spring open the slot edge of the mount. In a presently preferred method of practicing this invention, these spreader wedges are stationary, and the slide mount moves edgewise onto and past them, pausing while the pair of wedge members are symmetrically positioned with respect to the internal pocket in the mount. These pair of wedge members define a slideway channel between them along which the leading film transparency is moved into the mount.

In the preferred embodiment of the slide mount, there are two such recesses or lead spaces, located near opposite ends of the slot edge. Thus, the slide mount can be handled and loaded with either surface of the slide mount facing upwards.

Among the features and advantages of the illustrative method and apparatus of the invention, described herein, are the following:

(1) The film may be cut into each individual transparency before, not after, the transparency is fully inserted into the slide mount. The freshly cut end of the film strip is stiffened by bending to serve as a pusher for pushing the cut transparency into the internal pocket within the slide mount. Thus, advantageously, the moving parts are very light with low inertial forces, because the individual cut transparency has only a small amount of mass to be accelerated. Since the end of the film strip is used as a pusher, it cannot wear out, because a new cut end is exposed in each recurring cycle of operation.

(2) The motion of the mount itself into the "loading" (insertion) station serves to wedge open the openable end of the pre-closed slide mount. Thus, two objectives are accomplished with the one motion and there is no need for additional equipment for opening the slot end of the mount.

(3) There are a pair of fixed spreader wedge members serving to define a channel or path between them along which the cut transparency is pushed into the internal pocket in the slide mount, thereby accomplishing both the opening function and providing clearance through which the cut film transparency can move.

(4) In addition, the present slide mounting apparatus enables either cardboard or plastic mounts to be automatically loaded.

(5) If desired the apparatus can be arranged with only three stations for the slide mounts: (i) stack station, (ii) loading station, and (iii) printing station. Therefore, the machine can be relatively compact and does not require many moving parts.

(6) The movement of the slide mount from station to station and insertion of the film transparency into the slide mount in the loading station are accomplished with a common drive assembly. This common drive assembly in this embodiment is shown as a lever which swings back and forth. It advances the slide mount when it moves one way and then inserts the film transparency when it moves back again. A motor operates this common drive assembly to produce one complete loading cycle during each revolution of the motor, thereby providing a relatively uncomplicated and highly effective mechanism. In the presently preferred apparatus, the single-revolution motor is a synchronous motor which is controlled to make one or more revolutions and then to stop at its initial point, without the use of a clutch, belts, or index solenoid or similar braking or timing mechanism. In distinction to this present uncomplicated drive system, all of the prior art machines, insofar as I am aware, have drive systems in which the motor idles continuously. This continuous motor motion results in wear of bearings, drive belt, clutch parts, and electric brakes or slip clutches in some cases. Moreover, the continuous running of the motor in prior machines requires the use of timing or indexing mechanisms.

(7) The lever drive assembly of the present machine provides a greater mechanical advantage during the advancement of the slide mounts, when the load is greater, than it does during the insertion of the cut film transparency.

(8) Moreover, the lever drive assembly in the present apparatus is arranged to provide gradual acceleration and deceleration. A smooth harmonic rise and fall in velocity of the moving parts is achieved. The initial movement of the driving member is along a curve which is tangential to the driven member of the lever assembly so that the acceleration starts smoothly from rest.

(9) By virtue of the fact that a common drive assembly advances the slide mounts and also advances the film strip and loads the cut film transparency into the slide mounts, there are no timing problems. The relatively few moving parts are mechanically interlocked by the common drive assembly and cannot get themselves out of timing or out of phase with respect to each other.

(10) By virtue of the uncomplicated overall drive arrangement utilized in the apparatus described, less noise and vibration are generated than in the case of heavier more complex mechanisms. Also, less power consumption occurs in the described apparatus than in any commercially available prior art slide loading machine, insofar as I am now aware.

BRIEF DESCRIPTION OF THE DRAWINGS

The various features, aspects and advantages of the present invention will be more fully understood from a consideration of the detailed description set forth below in conjunction with the accompanying drawings, in which:

FIG. 7 is an enlarged plan view of the film strip cutting and loading regions of the machine, as shown in FIG. 6, with a film transparency shown fully inserted into a slide mount;

FIG. 8 is a further enlarged sectional view taken along the line 8—8 in FIG. 7 showing the manner in which the arcuately bowed film strip advantageously engages the cut film transparency in pushing relationship;

FIG. 9 is an enlarged partial sectional view taken along the line 9—9 in FIG. 7 showing the interaction between the wedge members and the slide mounts;

FIG. 10 is an enlarged partial sectional view taken along the line 10—10 in FIG. 7 showing further aspects of the interaction between the wedge members and the slide mounts and with the film transparency loaded into the slide mount;

DETAILED DESCRIPTION

Figure 3:
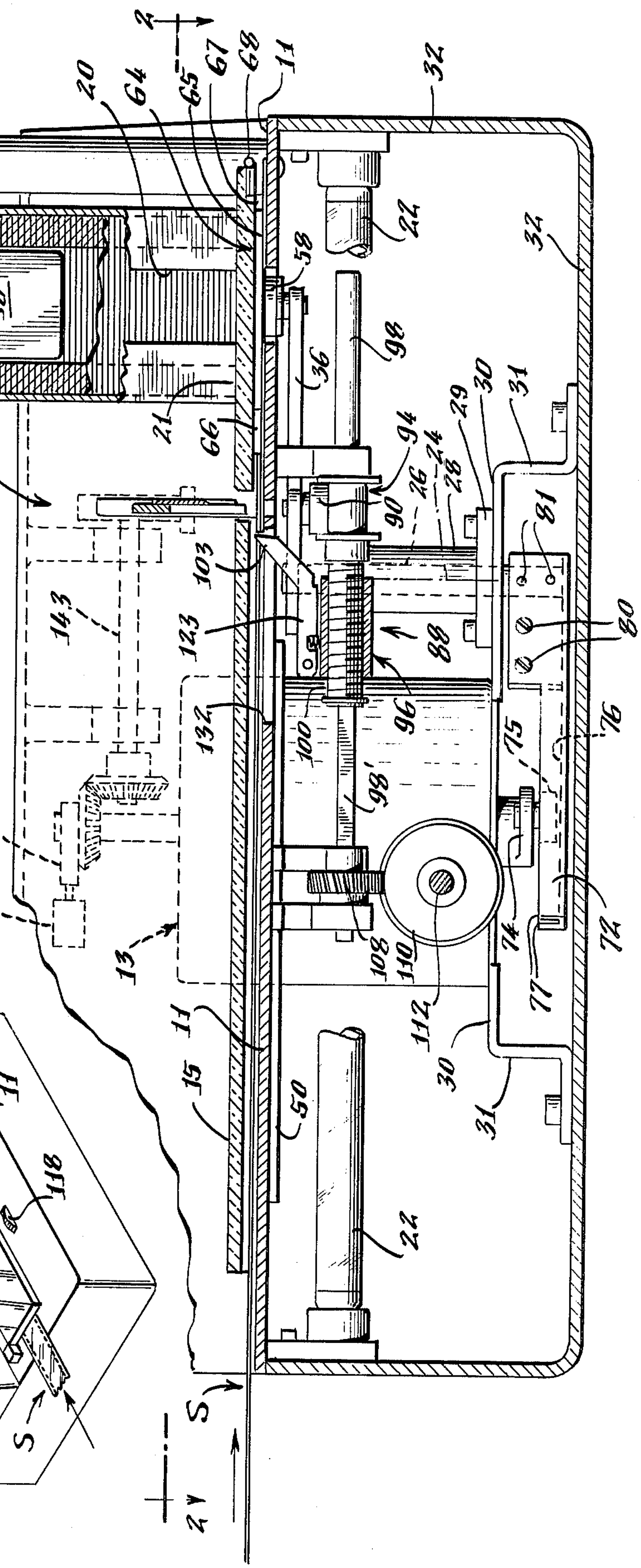
FIG. 3 is a front elevational sectional view taken along the line 3—3 in FIG. 4.
Figure 1:
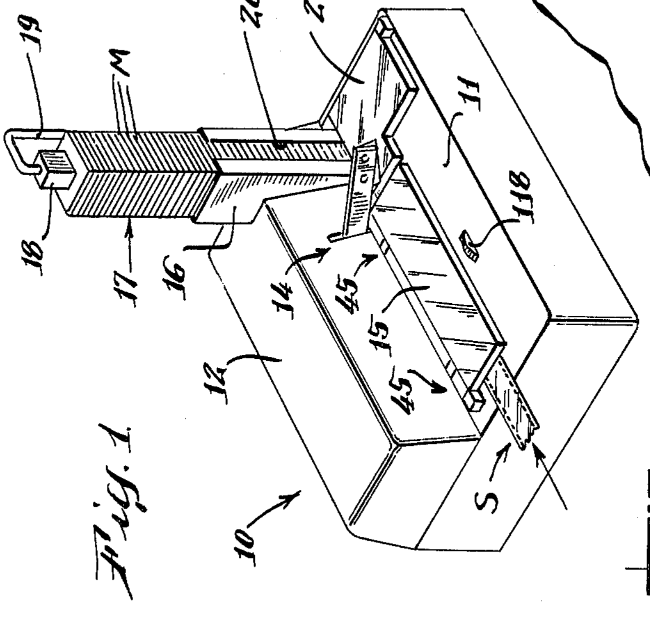
FIG. 1 is a perspective view of a slide mount loading machine embodying the apparatus and employing the method of this invention.

The method and apparatus for automatically loading film transparencies into pre-closed slide mounts will be explained initially with reference to FIGS. 1, 2, 3 and 4. The slide mount loading machine 10 includes a main deck 11 extending across the front of the machine as seen in FIG. 1 with an elevated rear housing 12 which encloses the top of the drive motor 13 (FIG. 3) and the cutting mechanism 14. The film strip S is advanced during operation across the main deck from left to right, as seen in FIGS. 1 and 3, beneath a hinged transparent cover 15. The film strip S may be supplied from any suitable supply source such as a reel or film strip dispenser and can conveniently be viewed beneath this cover 15.

The pre-closed empty slide mounts M are stacked up in a hopper 16. This stack 17 of mounts M may extend for a substantial height above the top of the hopper 16, and for purposes of holding the elevated stack there is a vertical guide bar 18 of rectangular cross section detachedly held by a removable stand 19. This vertical guide bar 18 fits closely but freely down through the windows of the preclosed side mounts, as seen in FIG. 3, and its lower end is positioned below the top of the hopper 16. There may be a vertical opening 20 in the front of the hopper so that the operator can quickly see when the stack 17 needs to be replenished.

During operation of the slide-loading machine 10, the slide mounts M are pushed forward one at a time out of the bottom of the hopper 16 into a loading position beneath a second hinged transparent viewing cover 21. Thus, the slide mount to be loaded is located on the main deck 11 where it can clearly and completely be seen as the film transparency is being loaded into it. The operation will be explained in greater detail below. There is a light source 22 (FIG. 3) which illuminates translucent panels for underlighting the film strip S and the slide mount being loaded. This light source 22 is shown as a flourescent lamp extending essentially the full length of the machine from left to right, as seen in FIG. 3, beneath both the film strip track and the loading station.

Figures 4, 5:
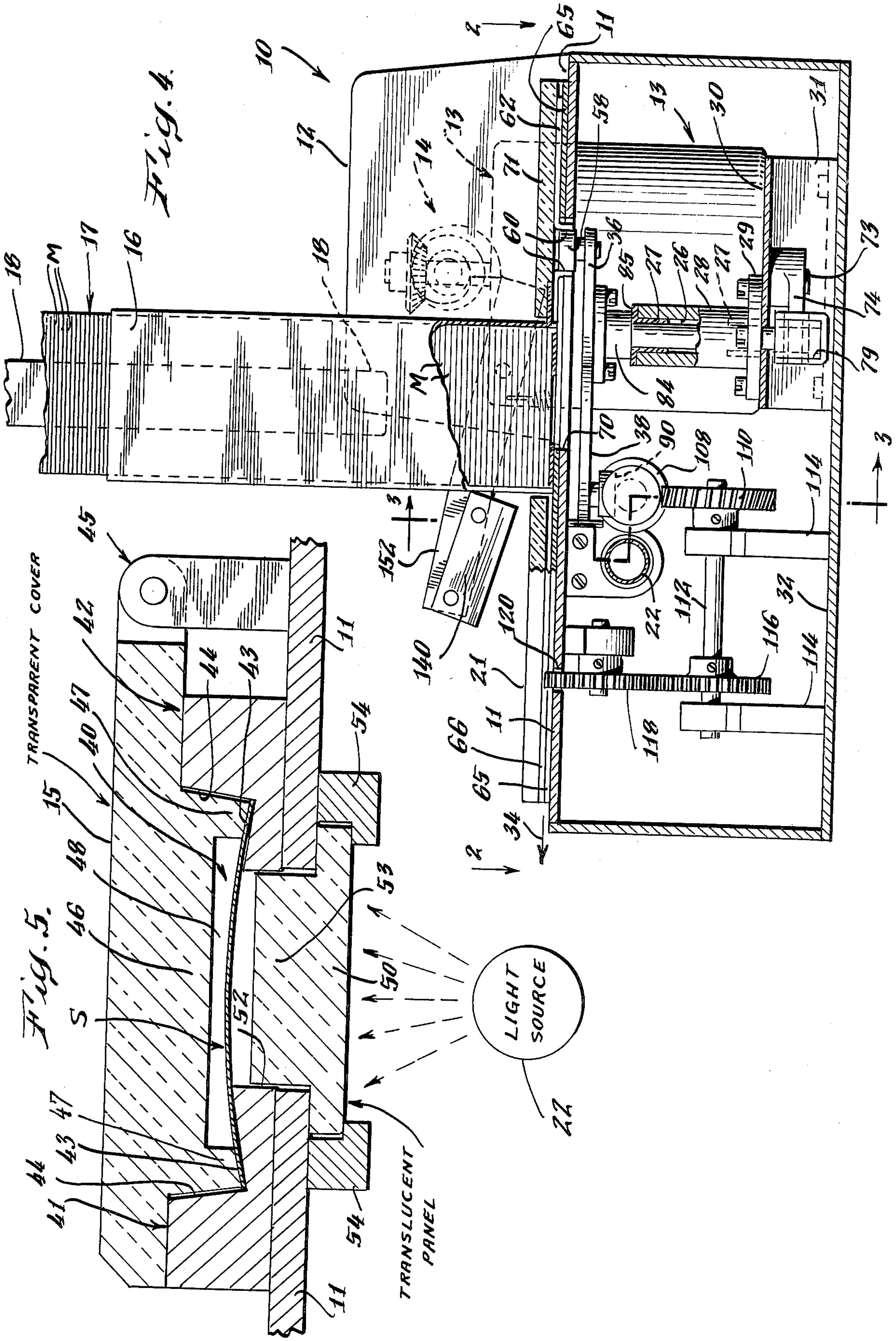
FIG. 4 is an end elevational sectional view taken along the line 4—4 in FIGS. 2 and 3.
FIG. 5 is an enlarged partial sectional view taken along the line 5—5 in FIG. 2 and showing the film strip track and cover, with the film strip bowed into an arcuate configuration and being uniformly underlighted for convenient viewing on the main deck of the machine.

In order to advance the film strip S and the slide mounts and to load the cut film transparency in proper timed relationship, there is a common drive assembly 23 (FIG. 2) which moves back and forth for producing these functions. In this illustrative machine embodiment of the invention, the common drive assembly 23 is a lever assembly which is swung back and forth in a horizontal plane about a fixed pivot axis 24. The fixed pivot axis 24 is defined by a vertical rotatable pivot shaft 26, as best seen in FIG. 4. This rotatable shaft 26 is journalled in upper and lower sleeve bearings 27 (FIG. 4) held by an upright tubular bracket 28 attached by a mounting flange 29 to a support plate 30. As seen most clearly in FIG. 3, the support plate 30 has its opposite ends 31 bent down and secured to the bottom of the machine cabinet 32. The motor 13 also is supported upon the plate 30, which may be considered a lower deck within the machine.

Figure 2:
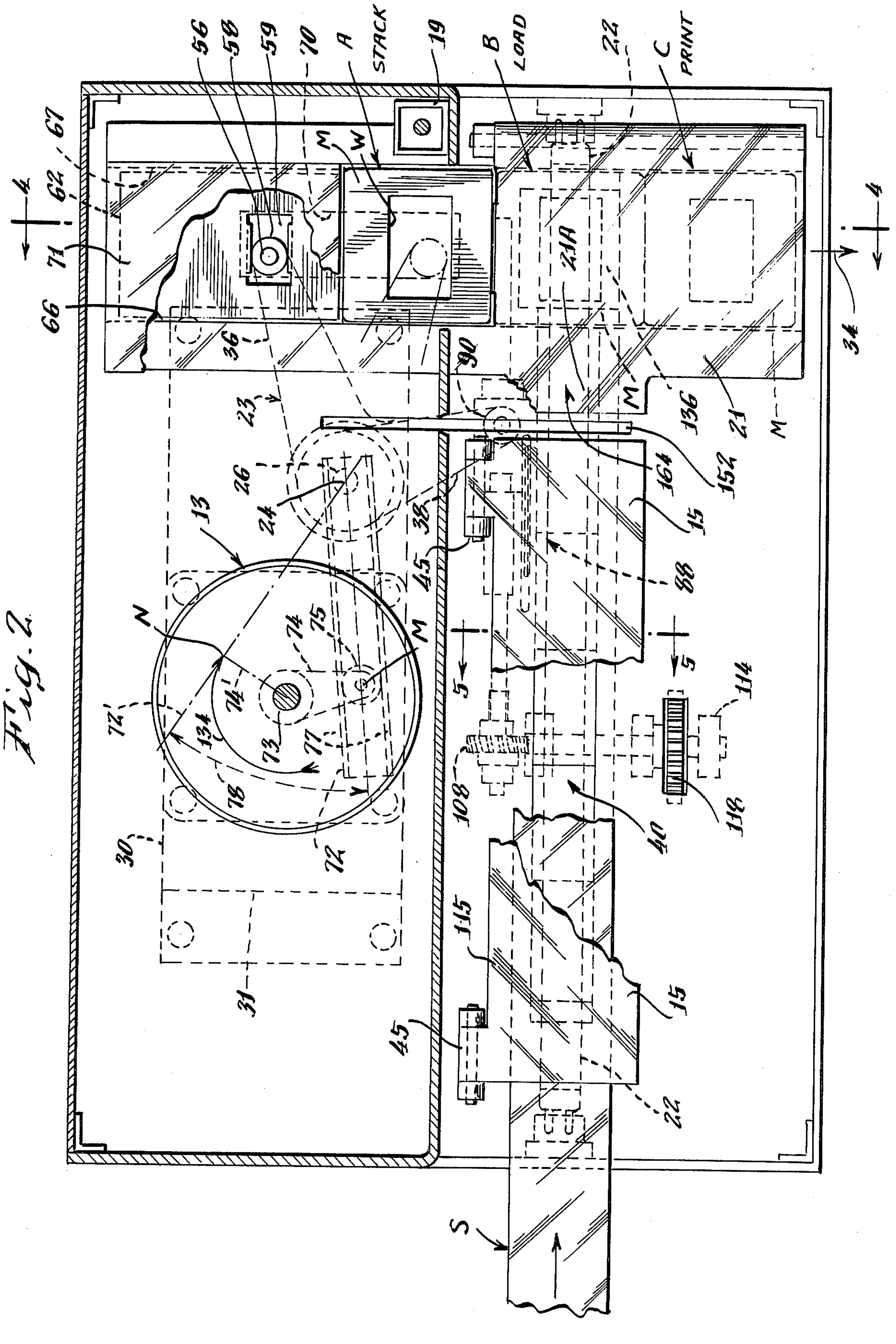
FIG. 2 is a plan view as seen looking down on the machine and shown partially in section, with a portion shown broken away for clarity of illustration. The section of FIG. 2 is taken along the plane 2—2 in FIGS. 3 and 4.

The pre-closed slide mounts are stacked up in a stack station A (FIG. 2) as defined by the hopper 16. They are moved one-at-a-time in succession into a load station B where the film transparency is loaded into a pre-formed receiving pocket in the slide mount. The loaded slide mounts are then moved one-at-a-time in succession into a print station C in which appropriate printed data may be impressed upon each slide mount. This printed data may include the date of loading and a sequential numbering of each batch of slide mounts plus other indicia, if desired. After the printing step is accomplished, the completed slide mounts are discharged one-at-a-time from the front of the machine along an output channel as indicated by the arrows 34 (FIG. 2). This output channel 34 may lead into a hopper or may lead onto a conveyor for carrying the completed slide mounts to a packaging machine, and so forth.

The lever assembly 23 includes a first arm 36 (FIG. 2) for advancing the pre-closed slide mounts from station-to-station, and a second arm 38 for advancing a film strip S along a track 40. As seen enlarged in FIG. 5, this track 40 is formed by a pair of spaced, parallel metal guide rails 41 and 42 which have a generally L-shaped configuration in cross section. Each of these guide rails 41 and 42 has an upwardly facing support surface 43 which underlies the respective edge portion of the film strip S and an inwardly facing edge guide surface 44 which guides the adjacent edge of the film strip S. In this particular example, the support surface 43 and the edge guide surface 44, are at right angle to each other, while the support surface 43 slopes downwardly in a lateral direction away from the centerline of the film S at a slope angle in the range of approximately 6° to 12° to the horizontal. Thus, the inwardly facing surfaces 44 diverge outwardly in an upward direction each at an angle of approximately 6° to 12° to the vertical.

The cover 15 is formed of rigid transparent plastic, for example, such as methacrelate material, e.g. "Plexiglas," and has hinges 45 (only one can be seen in FIG. 5) providing a hinge pivot axis extending parallel to the film track 40. Thus, the cover can be swung up and back toward the elevated rear housing for easy insertion of the film strip S into the track 40. The cover 15 has a thicker central portion 46 including two spaced parallel ribs or runners 47 which project down to press the opposite edges of the film strip down onto the respective outwardly sloping support surface 43, causing the central portion of the film to bow upwardly as seen in FIG. 5 in an arcuate configuration. Between these protruding runners 47, the cover 15 is recessed upwardly to provide a clearance space 48 for accommodating the upwardly bowing film strip S.

Extending longitudinally beneath the track 40 is a translucent panel 50, for example, of milky-hued rigid plastic, which is illuminated by the light source 22, thereby providing an approximately uniform and strong backlighting zone beneath the film strip S. There is an elongated opening 52 in the main deck 11, and a thicker central portion 53 of the panel 50 projects up through this opening 52. A pair or retainers 54 hold this illuminator panel 50. The bowing of the film strip S is an arc from edge-to-edge provides a substantial longitudinal rigidity, which is advantageously utilized as explained further below.

Returning attention to the lever assembly 23, as seen in FIG. 2, it is noted that the first arm 36 for moving the slide mounts M is connected by a pivot pin 56 to a roller 58 which, in turn, is captured between a front and rear pair of bent tabs 60 (FIG. 4) formed on a movable slide mount pusher 62. This pusher 62 has a generally rectangular plate configuration as seen in plan view in FIG. 2 with its width being equal to the width of a pre-closed mount M. An H-shaped opening 59 is cut into this pusher plate near to the front end, and the resultant pair of tabs 60 (FIG. 4) are then bent down at the appropriate spacing for closely straddling the roller 58, while allowing this roller freedom to travel laterally for accommodating arcuate motion of the arm 36. Thus, the pusher 62 is a one-piece structure and is light in mass. The pusher 62 reciprocates along a guideway 64 (FIG. 3) as it is driven by the swinging arm 36 of the lever assembly 23. This guideway 64 is formed by a track plate 65 mounted on the deck 11 with a pair of spaced parallel edge guide rails 66 and 67 mounted on the track plate spaced apart slightly wider than the width of the pusher 62 or slide mounts M. To provide clearance for movement of the tabs 60 and roller 58, there is an elongaged opening 70 (FIG. 2) cut into the deck 11 and track plate 65. A transparent cover 71 (FIGS. 2 and 3) is positioned over the reciprocating pusher 62 behind the stack station A. The transparent viewing cover 21 over the load and print stations is hinged by a piano hinge 68 (FIG. 3) to be opened at any time desired by the operator.

To swing the lever assembly 23 back and forth, it includes a third arm 72 (FIG. 3) extending over into a location beneath the drive motor 13. The motor shaft 73 revolves a crank 74 having a drive roller 75 at its outer end which extends down into a U-shaped channel 76 formed by a pair of spaced parallel edges 77 of the arm 72 which are bent up as seen in FIG. 3. Thus, as the drive roller 75 is revolved by the crank arm 74, it causes the arm 72 to swing back and forth over an arc 78 (FIG. 2) as shown by the double-headed arrow. The U-shaped arm 72 is attached to the lower end of the pivot shaft 26 by securing a block 79 (FIG. 4) by machine screws or rivets 80 (FIG. 3) between extensions of the bent up edges 77. Then the shaft 26 is held by pins 81 in a socket in this block 79.

During each cycle of operation of the machine 10, the motor shaft 73 and the crank 74 make one full revolution. The motor may be operated to make one revolution and then stop or the motor may be run continuously for an interval until a pre-set number of revolutions is attained and then stop automatically.

This type of operation is accomplished by using a synchronous motor, for example, such as a "SLO-SYN" Motor available commercially from Superior Electric Company in Bristol, Conn. This motor makes exactly one revolution during the machine cycle, controlled by means of a control microswitch 82 (FIG. 3) actuated by a cam lobe 83 mounted on an upper motor shaft. A counter and second switch (not shown) bypassing the switch 82 may be used to provide the pre-set interval of continuous operation. There is no need for belts, clutches, brakes or-similar complicating factors as used in prior art machines.

The arms 36 and 38 of the lever assembly 23 are secured to a hub 84 (FIG. 4) which, in turn, is attached to the upper end of the pivot shaft 26. A thrust bearing 85 is positioned below the hub 84 on the tubular bracket 28. In FIG. 2, the crank 74 and roller 75 are shown in their initial position corresponding with the slide mount pusher 62 being located in its fully retracted location and with the second arm 38 being fully advanced.

It is noted that the crank 74 is initially positioned, so that the drive roller 75 will smoothly accelerate and decelerate the arm 72 as will be explained in detail further below.

Figure 12:
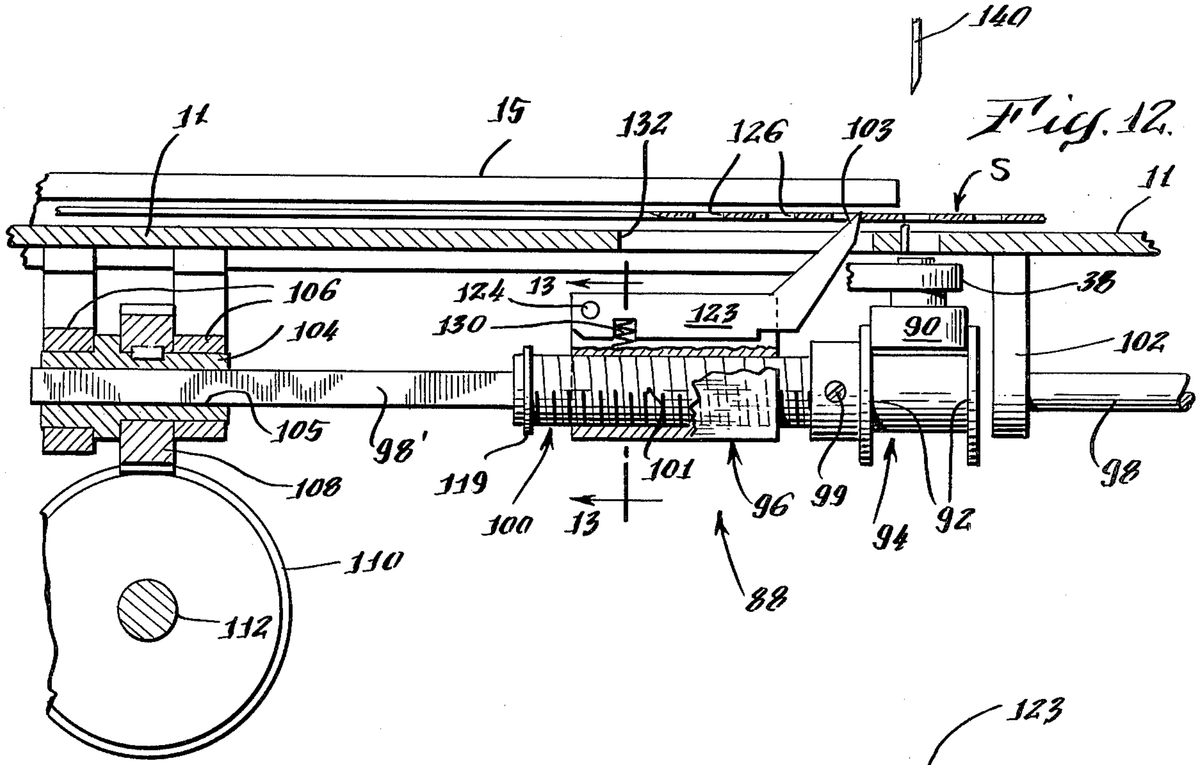
FIG. 12 is an enlarged partial elevational sectional view showing the adjustable film strip advancing mechanism, which can also be seen on reduced scale in FIG. 3.
Figure 13:
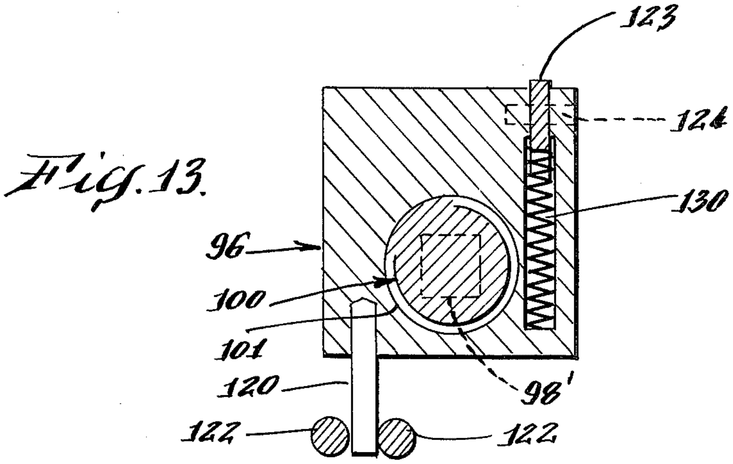
FIG. 13 is a cross sectional view of the film claw carriage taken along the line 13—13 in FIG. 12 and shown further enlarged.

In order to move the film strip S along its track 40, there is a film transport mechanism 88, as seen most clearly in FIGS. 3 and 12, which is reciprocated back and forth in a direction parallel with the track 40 by means of a drive roller 90 mounted on the outer end of the arm 38. This drive roller 90 engages between the flanges 92 (FIG. 12) of a spool 94 for propelling a movable carriage 96 back and forth with a movable traverse rod 98 and 98'. The spool 94 is secured by a pin 99 to a screw-threaded barrel member 100 which fits through a threaded hole in the carriage 96, as seen in FIG. 13. The threaded region 101 of this barrel has a relatively steep pitch, for example, a multi-start thread of ¼ inch pitch, which is used for adjusting the relative position of the carriage 96 on the barrel member 100 for purposes of adjusting a film-engaging claw 103. By rotating the barrel member 100 one way or the other, the carriage 96 and claw 103 are moved relatively to the left and right as seen in FIG. 12.

As the spool 94 is reciprocated back and forth, it reciprocates the barrel 100 which carries the carriage 96 along with it. Also, the traverse rod 98, 98' is attached to the barrel 100 and reciprocates. The right end 98 of the traverse rod is round and slides in a bearing mount 102 (FIG. 12), while the left end 98' is square and slides in the square broached bore 105 of a rotatable sleeve bearing 104 which is journalled in a pair of mounting brackets 106.

The square cross section of the traverse rod portion 98' enables the barrel member 100 to be turned about its axis for producing the adjustment discussed above. To turn the square rod 98', the square-bore sleeve bearing 104 is turned by a 45° helical gear 108 which is engaged by a second 45° helical gear 110 fastened to a rotatable shaft 112. The ratio of diameters of gears 110 and 108 is 2:1 for multiplying the adjustment motion. FIG. 4 shows this rotatable shaft 112 held by a pair of supports 114 with a spur gear 116 attached to the other end of the shaft. A meshing spur gear 118 projects up through a slot 120 (FIG. 4) in the deck 11, as seen also in FIG. 1. Thus, the gear 118 serves as a convenient thumb wheel for adjusting the relative position of the film-engaging claw 103. A retainer clip ring 119 prevents the carriage 96 from being adjusted too far along the barrel member 100.

To keep the carriage 96 upright on its barrel member 100, there is a stabilizer leg 120 (FIG. 13) which projects down as seen in FIG. 13 between a pair of parallel guide elements 122. The film claw 103 is situated on a pawl 123 which is mounted on the carriage 96 by means of a hinge pin 124 and the claw 103 at its free end is positioned for engagement into sprocket holes 126 (FIG. 12) in the film strip S. This pawl 123 is urged toward engagement with the film strip S by means of a spring 130 (FIG. 13) on the carriage. As seen more clearly in FIG. 12, there is a clearance slot 132 in the deck 11, so that the claw end 103 of the pawl can rise up against the edge region of the film strip S where the sprocket holes 126 are located. The adjustment of the film claw 103 described above as produced by the thumb wheel 118 serves to position this claw in the proper relationship with the sprocket holes 126 which may be in different longitudinal position in various film strips S relative to the framing of the images on the film strip.

During the first poriton of each revolution, the drive roller 75 revolves as shown by arrow 134 (FIG. 2) from the initial position M over to an intermediate position N. In this illustrative apparatus, the drive motion from M to N amounts to an arcuate travel of about 220° about the axis of the motor shaft 73. This motion of the drive roller 75 swings the lever assembly 23 clockwise, as seen in FIG. 2, and causes the pusher 62 to urge the lowermost pre-closed slide mount M from the "STACK" station A over into the "LOAD" station B. At the same time, the pre-closed slide mounts M which were previously located in stations A and B, respectively, in edge abutting relationship one against another are advanced into stations B and C. The slide mount which was previously in station C is pushed by the following slide mount out into the output channel 34. This clockwise swinging motion of the lever assembly 23 causes the film transport carriage 96 to retract by moving to the left in FIG. 3 away from the initial position shown. As soon as the carriage has been fully retracted, the claw end 103 of the pawl 123 rises up and enters the appropriate sprocket hole 126 ready for the film strip S to be advanced.

The drive roller 75 when at the initial position M and also when at the intermediate position N is moving in a direction which is instantaneously parallel with the linear cam slot or channel formed by the parallel sides 77 of the arm 72. Thus, the acceleration and deceleration of the lever assembly 23 advantageously occurs smoothly without any jerking motion. The positions M and N are the locations of extreme extension of the crank arm 74 as viewed from the fixed pivot axis 24, for in these positions the crank 74 is perpendicular to the longitudinal axis of the lever arm 72.

During the second portion of each revolution, the drive roller 75 revolves from the intermediate position N back around to the initial position M. The arcuate travel from N back to M in this illustrative example is about 140°. The lever assembly is now being swung counterclockwise retracting the pusher 62 while simultaneously causing the film transport mechanism 88 to advance the film strip S, which, in turn, pushes a previously cut film transparency into an internal pocket 136 in the slide mount M located in the loading station B, as will be explained later. The slide mounts M remain stationary or dwell in their respective stations during counterclockwise swinging motion of the lever assembly 23.

A cutting mechanism 14 (FIG. 11) to be described, serves to cut off a film transparency from the film strip when the pusher 62 has commenced its pushing stroke, and thereafter during each revolution the cutter is re-cocked. To cut off each film transparency in turn from the film strip S, the cut off mechanism 14 is actuated so that the leading film transparency T is completely severed from the remainder of the film strip S, and the knife 140 is retracted before this film transparency is loaded into the pocket 136 in the slide mount in the loading station. Thus, the severed film transparency T is actually pushed into the internal pocket 136 by the freshly cut end of the remaining film strip. To enable the film strip S to accomplish its pushing function without buckling, there is the bowing track guide mechanism 40 (FIG. 5) which serves to bend the film strip S transversely. This transverse cylindrical bending of the film strip is similar to the way in which a carpenter's thin steel tape ruler is transversely cylindrically curved for providing longitudinal stiffness. Moreover, by virtue of the fact that the film strip is transversely curved, as seen in FIG. 8, while the film transparency T is being held flat by appropriate guides, there are two points X, X where the freshly cut end of the curved film strip positively abuts against the film transparency T for pushing it. There is no opportunity for the end portion of the film strip S to slip in overlapping relationship past the edge of the transparency T which is pushed thereby. For guiding the cut off transparency T, the cover 21 has an extension 21A (FIGS. 2 and 8) over near the cut off station. There is clearance 48 for the bowed film.

Figure 6:
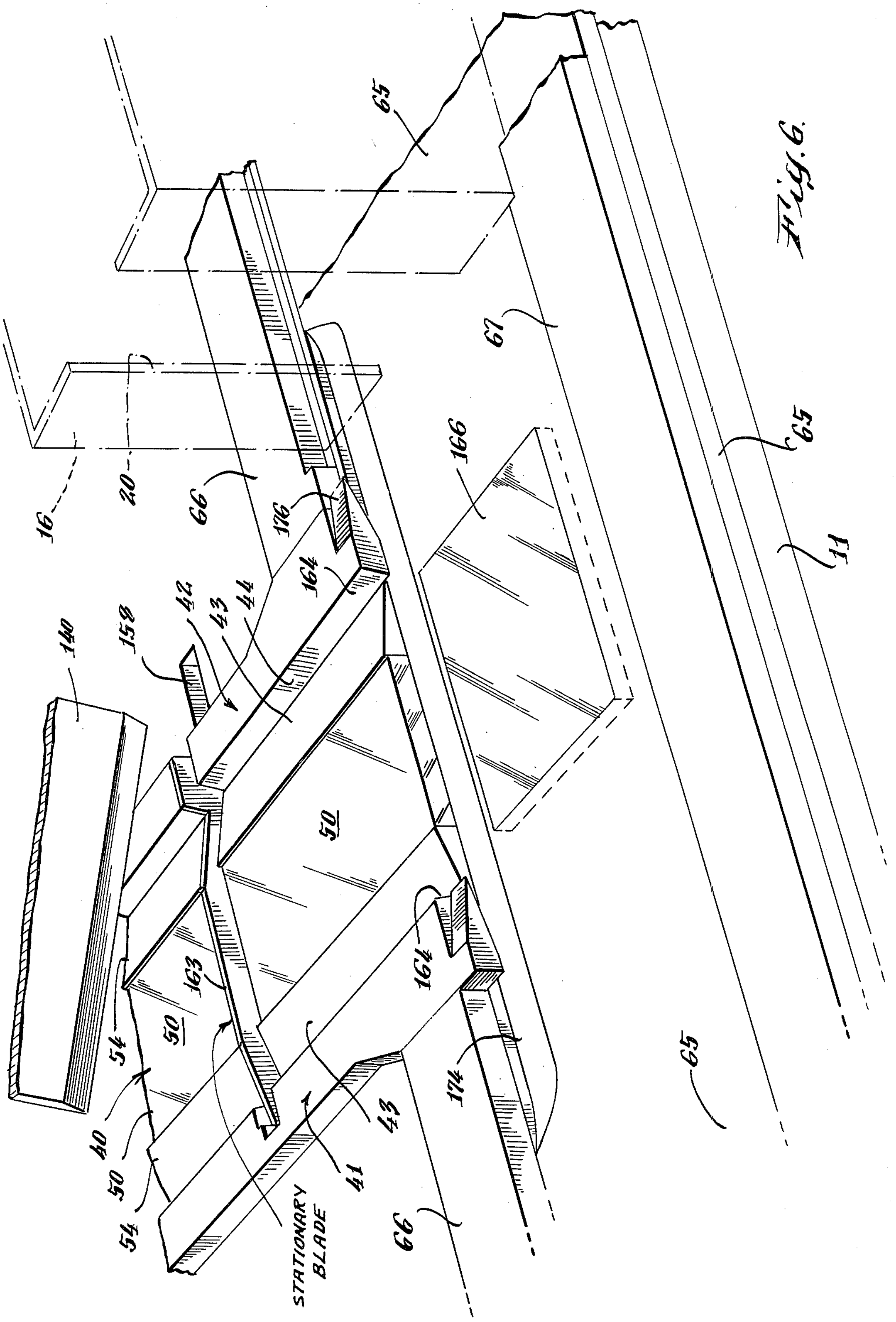
FIG. 6 is an enlarged perspective view of the film strip cutting and loading regions of the apparatus. The film strip, slide mounts, and transparent covers of the machine are omitted for clarity of illustration. The pair of wedge members for wedging open the loading slot of the pre-closed slide mounts and the tracks for guiding the slide mounts into engagement with the wedge members are shown enlarged.
Figure 11:
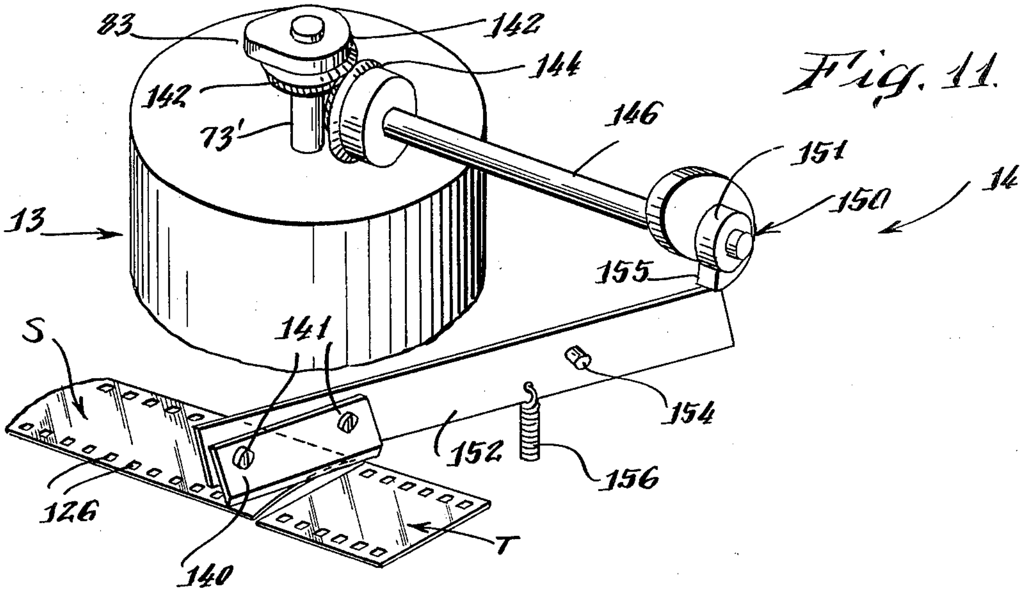
FIG. 11 is a partial perspective view illustrating how the film cutting mechanism is driven by the shaft at the upper end of the drive motor.

As shown in FIG. 11, the motor 13 has an upper shaft 73' turning a miter gear 142 driving another miter gear 144 for turning a shaft 146. A knife-bar operating cam 150 is turned by the shaft 146. This cam 150 has a curved slope 151 of increasing diameter for raising (retracting) a knife bar 152 mounted on a pivot 154. An abrupt step 155 of decreasing diameter allows a tension spring 156 to suddenly chop the blade 140 downwardly onto the film strip S. As seen in FIGS. 6 and 7, there is a cutting groove 158 provided in the film strip track 40 for accommodating the cutting blade 140 with a stationary blade 161 mounted along one wall of the cutting groove for producing a shearing action in cutting the film strip S. This movable blade 140 is mounted at an angle, as seen in FIGS. 4, 6 and 11, so that the cutting-shearing action commences at one edge of the film strip S and proceeds across to the other edge. The blade 140 is shown as a razor blade which is detachably fastened by screws 141 to the pivoted bar 152. The cutting off of the film transparency T from the end of the film strip S occurs after the transversely bowed end of the film strip has served to push the previous film transparency into a slide mount, as shown by the arrow 159 in FIG. 10.

By virtue of the fact that the cutter mechanism 14 is directly driven from the motor shaft, its operation remains in proper timed relationship with respect to the swinging motion of the lever system 23, without requiring any complex control or timing equipment.

As each slide mount M is moved (see FIG. 9) by pusher 62 edgewise (arrow 173) into the loading station B, a pair of spaced wedge members 160 and 161 enter between the two sides or layers 170, 171 of the pre-closed slide mount for temporarily spreading a loading slot of the end of the slide mount. These spaced wedge members 160 and 161 define a channel or slideway 164 (FIG. 6) between themselves through which the film transparency T can be slid through the wedge-spread slot into the internal pocket 136 in its mount. The spaced wedge members are symmetrically positioned with respect to the loading station B for guiding the freshly cut film transparency straight into the internal pocket. The loading channel 164 is aligned with the film track 40, as seen in FIG. 6. The wedge members 160 and 161 are shown formed on the ends of the edge guide rails 41 and 43.

A translucent illuminator panel 166 (FIG. 6), for example, of milky-hued plastic, is positioned in the loading station and has sufficient size to underly the entire window area W of the slide mount M. The cover 21 has a tapered clearance recess 168 (FIG. 10) formed therein to allow for deflection of one side 170 of the mount M. The deflection of the other side 171 is accommodated by another tapered clearance recess provided by a strip 174 of appropriate sloping configuration, as shown in FIGS. 6, 7 and 10.

As shown in FIG. 10 by the wedge member 160, these wedge members converge in a direction toward the center of the loading station, so as to mate with the generally V-shaped space between the spread sides 170 and 171 of the mount M. Because the first wedge 160 (FIG. 9) does the initial effort in wedging open the slide mount, it may have a longer and more gradually tapering nose 176 than the second wedge 171.

As soon as the loaded slide mount has been moved out of engagement with these wedge members 160 and 161, the natural resiliency of the two sides 170, 171 of the loaded mount cause them to spring back together (as partially illustrated at 175 at the left in FIG. 9) for retaining the film transparency T in its mount. The loaded slide mount is out of engagement with these wedge members when it has fully entered the print station C. If desired, the print station C may contain an ultrasonic or mechanical sealing mechanism for permanently sealing the slot end of the slide mount in the sealing region 180, indicated dotted in FIG. 7. This sealing region 180 may include one or more ultrasonic or mechanical spot seals.

Figure 14:
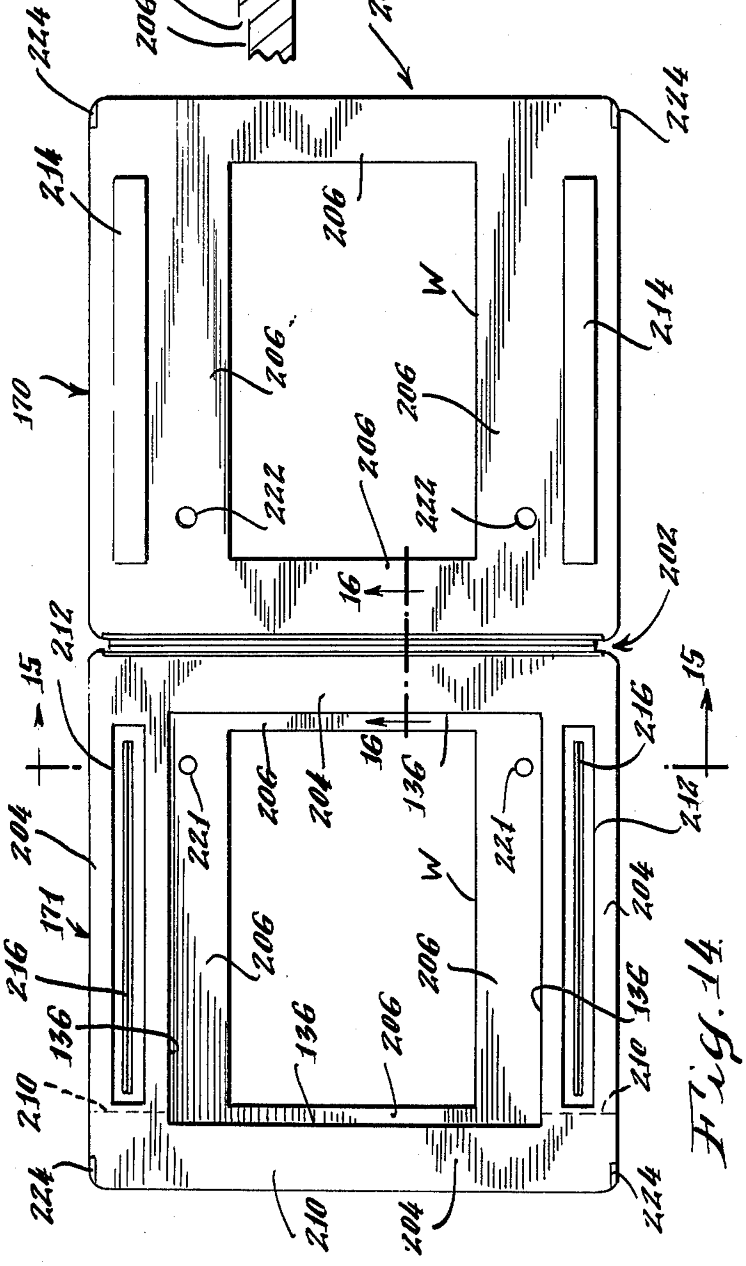
FIG. 14 is an enlarged plan view of an improved slide mount in its open position prior to being closed.

In FIGS. 14 through 17 is shown an improved pre-closed slide mount blank 200 which is made from stiffly flexible plastic material, for example, such as high impact polystyrene. Initially, the slide mount blank 200 is formed in open position, as shown in FIG. 14, and it includes two sides or halves 170 and 171 joined by a hinge region 202 and each of which has the usual window W for reviewing the area of the film transparency to be mounted therein. The two sides 170, 171 are similar in overall outline, as seen in FIG. 14, being positioned in the same plane but one being turned 180° relative to the other.

In order to define the internal pocket 136 (FIG. 15) for receiving the film transparency T, one of the sides 170 or 171, for example, the side 171 includes an elevated border region 204 extending continuously around the pocket 136. For example, assuming that the overall thickness of the completed slide mount M (FIG. 15) is to be approximately 0.048 of an inch, then each side 170 and 171 in the area 206 adjacent to the pocket 136, i.e. in the location closely surrounding the window W, may have a thickness of approximately 0.020 of an inch. The other side 170 has this thickness of approximately 0.020 of an inch continued out to the perimeter. The elevated border region 204 may have a height of 0.008 of an inch and may be an integral portion of the side 171. Thus, the perimeter portion of the side 171 where the elevated border is located is approximately 0.028 of an inch thick.

Figure 15:
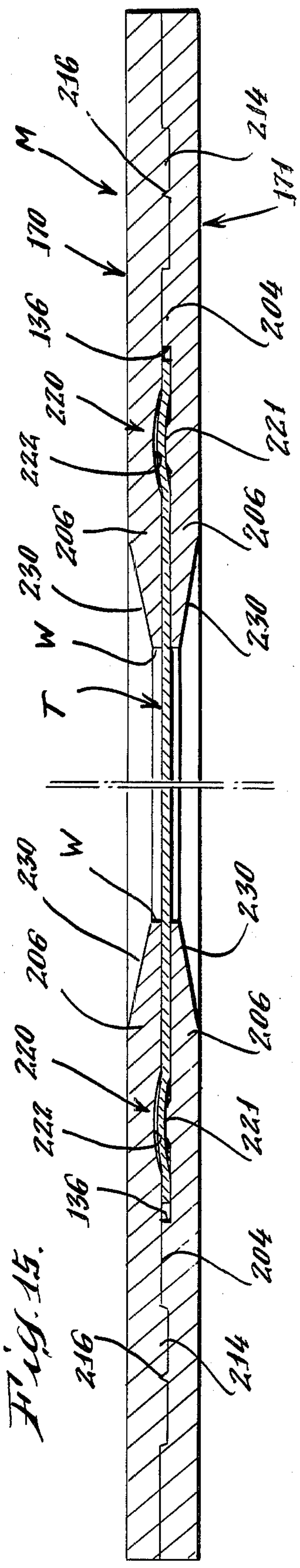
FIG. 15 is a very much enlarged cross sectional view taken along the line 15—15 in FIG. 14 but with the slide mount in its closed condition, and showing a film transparency in cross section mounted therein.

When the two sides are closed together, as seen in FIG. 15, the elevated border 204 then defines the pocket 136 which has a thickness equal to the height of the elevated border 204.

For uniting the two sides in their closed position, as seen in FIG. 15, adhesive bonding on the elevated border 104 may be used, except for the openable region 210 (FIG. 14) extending across the edge of the slide mount M where the film transparency is to be inserted.

A presently preferred mode of uniting the two sides 170 and 171 is to utilize ultrasonic welding instead of adhesive bonding. In order to direct the ultrasonic energy into desired localized bands 212 extending along the border 204 on both sides of the pocket 136 parallel to the length of this pocket but spaced laterally from the pocket, there are energy directors 214 and 216. The energy directors 214 are long narrow elevated ribs on the side 170, and the energy directors 216 are narrow sharp ridges centered in the bottom of clearance channels into which the energy director ribs 214 are mated.

In order to prevent any undue sliding movement of the mounted slide within the mount, there may be provided predetermined, frictional engaging clamp means 220, as shown in FIG. 15, for providing a predetermined, frictional grip on the loaded transparency for holding the transparency in its desired position relative to the window in the mount. This clamp means 220, shown exaggerated for clarity in FIG. 15, includes a smoothly rounded hump or raised area 221 on one side 171 facing into the film pocket 136 and positioned opposite to a depression 222 in the inner surface of the other side 170. There are a pair of such clamp means as will be seen in FIG. 14 located near the far end of the pocket, i.e. away from the loading edge 210 and near to the hinge region 202. The humps 221 slightly deflect the localized area of the film transparency T into the depression 222 for providing the frictional gripping effect. The amount of friction grip is predetermined by the extent of localized deflection as produced by the predetermined height of the humps 221, which may cause localized deflection in the range from approximately 0.002 to 0.005 of an inch in height.

In order to facilitate the action of the wedge members 160, 161 (FIGS. 6 and 9) in spreading the edge of the slide mount near the loading edge region 210 (FIG. 14), there is provided one or more neat recesses or wedge spaces 224 (FIG. 14). The recess 224 serves as a "lead" for admitting the nose 176 of the respective wedge members. In this presently preferred embodiment, there are two such wedge spaces 224, so that the pre-closed slide mount M can be handled and loaded with either side facing up. The spaces 224 are located near the corners of the slide mount and are formed as seen in FIG. 14 by small chamfered or tapered areas 224 on the mating corners of the two sides 170 and 171.

Figure 16:
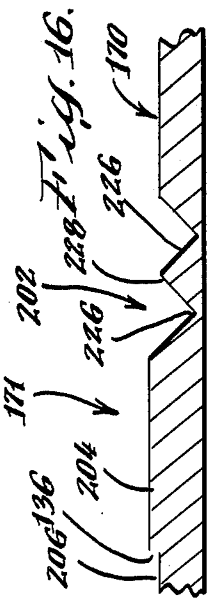
FIG. 16 is an enlarged partial sectional view taken in the hinge region of the slide mount, namely, along the line 16—16 in FIG. 14.
Figure 17:
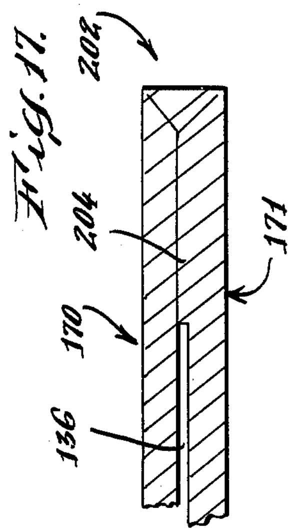
FIG. 17 is an enlarged partial sectional view corresponding to FIG. 16 showing the hinge region in its closed condition.

As seen most clearly in FIGS. 16 and 17, the hinge region 202 is provided by a pair of parallel V-shaped 90° notches 226 extending the full width of the slide mount with an intervening V-shaped ridge 228. The notches 226 close against the ridge 228 as seen in FIG. 17 when the slide mount is in its closed condition.

The exterior circumference of the window W on both sides 170 and 171 of the slide mount M are attractively chamfered at 230 as seen in FIG. 15 at an angle lying in the range from 6° to 12°.

Although the pre-closed slide mounts M are described as being formed of stiffly flexible rigid plastic material, pre-closed slide mounts can also be formed of cardboard. The machine 10 can load either plastic or cardboard slide mounts. Moreover, with no adjustments or other equipment changes or modifications, the same apparatus can load plastic and cardboard mounts interchangeably.

I claim:

1. The method of automatically loading film transparencies into slide mounts each having at least one window therein for viewing the transparency held in the mount comprising the steps of:

providing slide mounts each having two sides defining a receiving pocket between them for receiving a film transparency into the pocket to be held in sandwich relationship between the two sides of the mount, said two sides of each mount defining a resiliently spreadable region at one end of the mount communicating with said pocket through which a film transparency can be slid into the pocket for retaining a film transparency in said pocket when said spreadable region is in its normal position, providing at least one fixed wedge member adjacent to a loading station, moving the slide mounts one at a time edgewise into said loading station, engaging the edge of each successive slide mount with said fixed wedge member as the slide mount is being moved edgewise into the loading station for spreading said spreadable region at the end of the slide mount, sliding a film transparency into the pocket in the respective slide mount in the loading station through said spreadable region which has been spread by engagement with said fixed wedge, and moving the respective loaded slide mounts one at a time away from the loading station and withdrawing the respective slide mount away from said fixed wedge for allowing said spreadable region to return to its normal position for retaining the respective film transparency in the pocket of the respective slide mount.

2. The method of automatically loading film transparencies into slide mounts each having a pocket therein for receiving the transparency including the steps of:

positioning the slide mounts one at a time in a loading station, advancing a film strip endwise toward the respective slide mount in the loading station, cutting off the leading end portion of the film strip to form a film transparency in readiness to be loaded into the respective slide mount, bowing the film strip longitudinally along the film strip for providing longitudinal stiffness in the film strip, and using the freshly cut end of the bowed film strip for pushing the film transparency into the pocket in said respective slide mount.

3. The method of automatically loading film transparencies into slide mounts as claimed in claim 1, including the further step of:

moving the slide mounts one at a time edgewise into said loading station by using the successive slide mount for pushing the respective slide mount into the loading station.

4. The method of automatically loading film transparencies into slide mounts as claimed in claim 1, including the further step of:

providing two fixed wedge members aligned with each other and spaced apart by a distance slightly greater than the edge-to-edge width of the film transparencies, engaging the edge of each successive slide mount with a first of said fixed wedge members as the respective slide mount begins moving edgewise into the loading station for beginning to spread said spreadable region, continuing to engage said spreadable region with said first wedge member as the respective slide mount moves further into the loading station for progressively spreading said spreadable region, engaging said spreadable region with the second wedge member as the respective slide mount completes moving into the loading station for holding spread the region of the respective slide mount initially engaged with said first wedge member, sliding the respective film transparency between said two fixed wedge members into the pocket in the respective slide mount in the loading station, said film transparency passing through said spreadable region held spread by both of said wedge members with the opposite edges of the film transparency aligned with said two wedge members as the film transparency is sliding between them, and moving loaded slide mounts edgewise one at a time from the loading station and initially withdrawing the respective slide mount from said first wedge member as the slide mount begins moving away from the loading station and subsequently withdrawing the slide mount from the second wedge member as the slide mount completes moving away from the loading station.

5. The method of loading a film transparency into a slide mount having at least one window therein for viewing the transparency comprising the steps of:

providing a slide mount having two sides defining a receiving pocket between them for receiving a film transparency into the pocket in sandwich relationship between the two sides of the mount, said two sides defining a spreadable region at one edge of the mount through which a film transparency can be slid into the pocket, relatively moving a wedge member toward an edge of the mount near said region for engaging the wedge member between the two sides for temporarily resiliently spreading them apart in the vicinity of said region, cutting the film transparency off from a filmstrip prior to insertion of the film transparency into the slide mount, sliding a film transparency into the pocket through the temporarily spread sides of the slide mount, using the freshly cut end of the film strip to push the cut-off transparency into the receiving pocket, and transversely curving the film strip for longitudinally stiffening it to resist buckling when using the transversely curved film strip for pushing the cut-off transparency into the receiving pocket.

6. The method of loading a film transparency into a slide mount having at least one window therein for viewing the transparency comprising the steps of:

providing a slide mount having two sides defining a receiving pocket between them for receiving a film transparency into the pocket in sandwich relationship between the two sides of the mount, said two sides defining a slit at one end of the mount communicating into said pocket and said two sides being resiliently spreadable one from the other in the vicinity of said slit end for opening the slit, relatively moving a wedge member toward an edge of the slide mount near said slit end for engaging the wedge member between the two sides for temporarily resiliently spreading them apart in the vicinity of said slit for temporarily opening said slit, cutting a film transparency off from an end of a film strip, bowing the film strip longitudinally for longitudinally stiffening the film strip, pushing the film transparency by the end of the bowed film strip into the pocket in said slide mount by passing through said temporarily opened slit, and removing the wedge member for allowing the temporarily opened slit end to close for retaining the transparency in the pocket.

7. The method of loading a film transparency into a slide mount as claimed in claim 6, wherein said film transparency is loaded into the slide mount at a loading station, in which:

said wedge member is fixed in position at said loading station, and the slide mount to be loaded is moved into the loading station with said edge of the slide mount near said slit end engaging the stationary wedge member for temporarily resiliently opening said slit.

8. The method of loading a film transparency into a slide mount as claimed in claim 7, in which:

two wedge members are fixed in position adjacent to said loading station, said wedge members being positioned in aligned relationship, said wedge members being spaced apart sufficiently far to accommodate the movement of the film transparency between them, moving the slide mount edgewise into the loading station, sequentially engaging the edgewise moving slide mount with said wedge members as the slide mount is being moved into the loading station, positioning said slide mount in simultaneous wedging engagement with both of the stationary wedge members at the loading station for spreading said slit end, and pushing the film transparency between said two stationary wedge members into the pocket in said mount.

9. The method as claimed in claim 2 in which: the film strip is bowed longitudinally along the film strip prior to cutting off the transparency from the strip.

10. The method as claimed in claim 2 in which: the transparency is less bowed than the strip, and the cut end of the bowed film strip pushes against two spaced regions located along the edge of the transparency being pushed.

11. The method of automatically loading a film transparency into a slide mount having a pocket therein for receiving the transparency including the steps of:

cutting off an end portion of the film strip to form a transparency ready for loading into the slide mount, bowing the film strip longitudinally of the film strip for stiffening the strip longitudinally by pressing both edges of the film strip in one direction perpendicular to the plane of the film strip and by pressing in the opposite direction against regions of the film strip spaced inwardly small distances from the edges of the film strip, advancing the film strip longitudinally with the end of the longitudinally bowed film strip pushing against the transparency for pushing the transparency into the slide mount.

12. The method as claimed in claim 11 in which:

the end of the longitudinally bowed film strip pushes against a less bowed end of the transparency, and there are two points of intersection between the end of the bowed film strip and said end of the transparency, said two intersection points being symmetrically located and each being spaced inwardly a distance from the side edges of the transparency being pushed, whereby a symmetrical pushing action is obtained in pushing the transparency into said pocket.

13. The method as claimed in claim 11 in which:

the film strip is advanced horizontally, and the central portion of the film strip is bowed upwardly.

14. The method as claimed in claim 11 including the step of:

advancing the film strip along a path having a pair of spaced parallel support tracks each of which is sloping transversely of the path along which the film strip is advanced, and pressing the film strip against both of said sloping tracks for bowing the strip longitudinally.

15. The method as claimed in claim 14 including the steps of:

pressing the film strip against said parallel sloping tracks by a transparent cover, and illuminating the film strip and the mount being loaded from the under side for seeing the bowed film strip and transparency being pushed thereby into the pocket in said amount.

16. The method as claimed in claim 2, in which:

the respective slide mount having been loaded with the film transparency is removed from the loading station, the freshly cut end of the film strip remains protruding into the loading station as a result of having served to push the film transparency into the pocket in the respective slide mount, the next successive slide mount is moved edgewise into the loading station, and clearance is provided for enabling the next successive slide mount to enter the loading station while said freshly cut end of the film strip remains protruding into the loading station.

17. The method as claimed in claim 2, including the steps of:

removing from the loading station the respective slide mount after it has been loaded with the film transparency, allowing the freshly cut end of the film strip to remain protruding into the loading station as a result of having served to push the film transparency into the pocket in the loaded slide mount, moving the next slide mount edgewise into the loading station, receiving the protruding end of the film strip into the next slide mount as this next slide mount is moved edgewise into the loading station, cutting off the leading end portion of the film strip for forming a new transparency as its protruding end remains received in the next slide mount and thereby forming a new freshly cut end of the film strip, and using said new freshly cut end of the bowed film strip for pushing said new transparency into the pocket in said next slide mount.

18. The method as claimed in claim 17, including the step of:

removing the loaded slide mount from the loading station by using the next slide mount for pushing the loaded slide mount edgewise away from the loading station.

* * * * *